(12) United States Patent
Wang et al.

(10) Patent No.: US 8,046,875 B2
(45) Date of Patent: Nov. 1, 2011

(54) HINGE ASSEMBLY AND SUPPORT MECHANISM USING THE SAME

(75) Inventors: Jin-Xin Wang, Shenzhen (CN); Jun-Wu Duan, Shenzhen (CN); Fan Zhou, Shenzhen (CN); Ben-Gui Long, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 276 days.

(21) Appl. No.: 12/534,142

(22) Filed: Aug. 2, 2009

(65) Prior Publication Data

US 2010/0236023 A1    Sep. 23, 2010

(30) Foreign Application Priority Data

Mar. 21, 2009  (CN) .......................... 2009 10 301021

(51) Int. Cl.
*E05D 11/10*   (2006.01)

(52) U.S. Cl. ................. 16/338; 16/330; 16/340; 16/303

(58) Field of Classification Search .......... 016/337–339, 016/342, 330, 303, 374, 376, 377, 340, 355, 016/239, 357, 360, 361, 362, 367; 361/679.06, 361/679.07, 679.08, 679.12, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | |
|---|---|---|---|
| 4,186,905 A * | 2/1980 | Brudy | 248/478 |
| 7,533,446 B1 * | 5/2009 | Lin | 16/330 |
| 7,574,944 B2 * | 8/2009 | Yang | 74/567 |
| 7,870,644 B2 * | 1/2011 | Chang | 16/337 |
| 2005/0117284 A1 * | 6/2005 | Kida | 361/681 |
| 2006/0207061 A1 * | 9/2006 | Lu et al. | 16/330 |
| 2007/0039134 A1 * | 2/2007 | Lu et al. | 16/330 |
| 2007/0169312 A1 * | 7/2007 | Ho et al. | 16/330 |
| 2009/0158556 A1 * | 6/2009 | Chang et al. | 16/330 |
| 2009/0235489 A1 * | 9/2009 | Chang et al. | 16/340 |
| 2010/0064477 A1 * | 3/2010 | Wang | 16/297 |
| 2010/0101053 A1 * | 4/2010 | Li et al. | 16/341 |
| 2010/0107369 A1 * | 5/2010 | Li et al. | 16/374 |

* cited by examiner

*Primary Examiner* — Chuck Y. Mah
(74) *Attorney, Agent, or Firm* — Altis Law Group

(57) ABSTRACT

A hinge assembly includes a pivot shaft, a rotary member and a steady member sleeved on the pivot shaft. The rotary member and the steady member faces each other and are rotatable relative to each other. The rotary member forms a first peak, and the steady member forms a second peak. A friction portion is formed between the rotary member and the steady member. A thickness of the friction portion exceeds or equals to a thickness of either of the first peak or the second peak, and is less than the combined thickness of the first peak and the second peak. A support mechanism using the hinge assembly is also provided.

20 Claims, 3 Drawing Sheets

HINGE ASSEMBLY AND SUPPORT MECHANISM USING THE SAME

BACKGROUND

1. Technical Field

The present disclosure generally relates to hinges, and more particularly to a hinge assembly applied in a support mechanism.

2. Description of Related Art

Many electronic devices include two hinged elements. To ensure that one part is rotated to a desired position relative to the other part, a hinge assembly applied in an electronic device includes a steady member and a rotary member resisting each other. The steady member and the rotary member are locked with different parts of the electronic device, respectively. The steady member has one or more peaks, and the rotary member has corresponding number of valleys. When one part of the electronic device reaches predetermined positions, the peaks of the steady member are received in the corresponding valleys of the rotary member. When the rotary member rotates relative to the steady member, the peaks of the steady member slide out of the valleys and resist the rotary member. A frictional force is generated between the steady member and the rotary member, whereby, the steady member and the rotary member can be rotated through any desired angle and be maintained at the final position.

However, the steady member and the rotary member are also resisted by other components from two sides, so when the peaks of the steady member slide out of the valleys of the rotary member, the peaks tightly resist the rotary member and generate a large frictional force. Therefore, the peaks of the steady member may be abraded over time, and the components loosened, whereby the service life of the hinge assembly is affected.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The present hinge assembly may be applied in any electronic device with two hinged parts, such as notebook computers, LCD monitors, DVD (digital video disk) players, and others. Hereinafter, for the purposes of conveniently describing an exemplary application of the hinge assembly, the hinge assembly applied in a support mechanism of a LCD monitor is described and illustrated.

Figure 1:
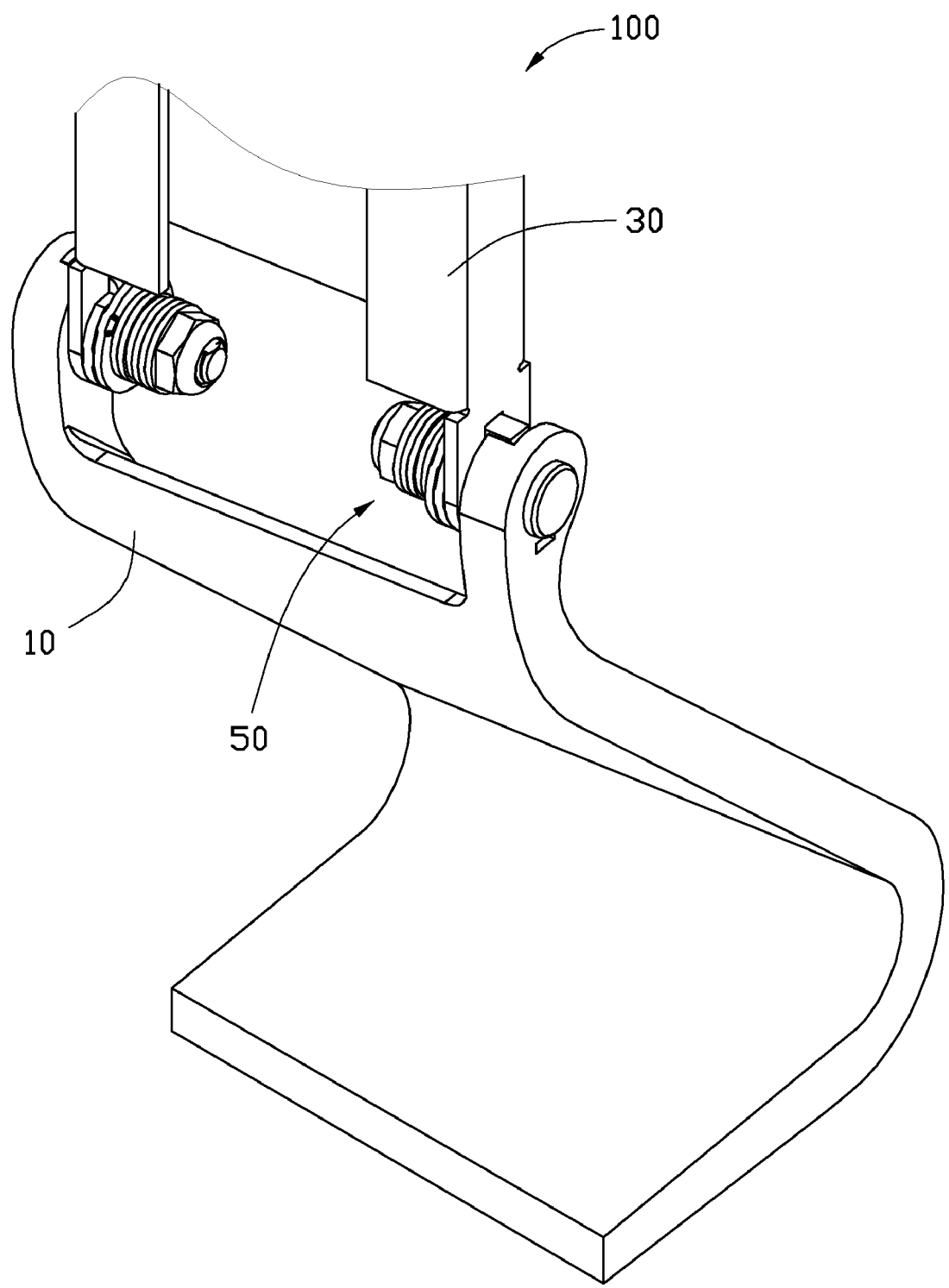
FIG. 1 is a partially assembled, isometric view of a support mechanism of a hinge assembly, the hinge assembly including a steady member and a rotary member.

Referring to FIG. 1, the support mechanism 100 includes a supporting bracket 10, a rotary bracket 30, and two hinge assemblies 50 hinging the rotary bracket 30 on the supporting bracket 10.

Figure 2:
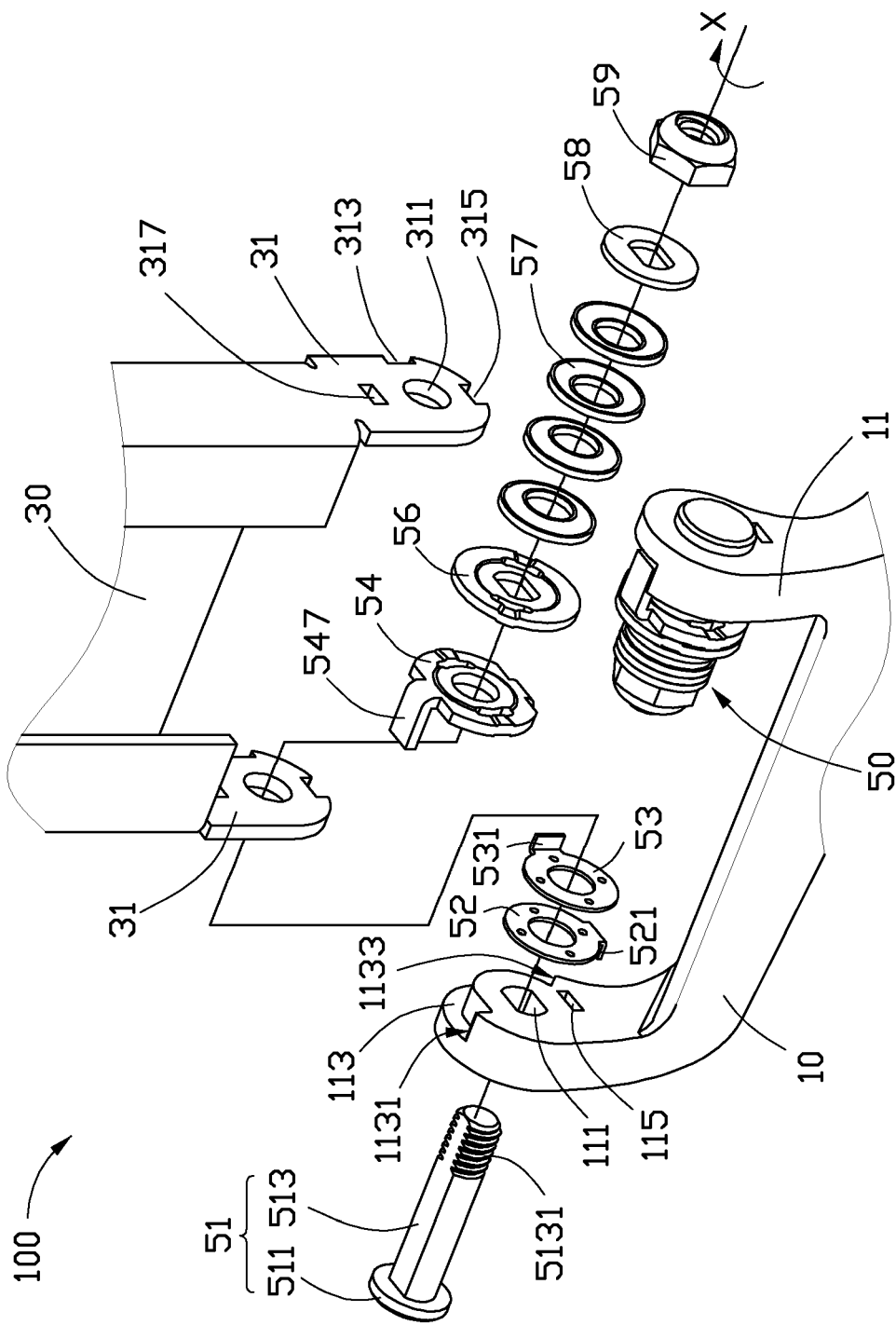
FIG. 2 is an exploded, isometric view of the hinge assembly of the support mechanism of FIG. 1.

Referring to FIG. 2, the supporting bracket 10 forms two supporting legs 11 extending from an end thereof. The supporting legs 11 extend parallel to each other. Each supporting leg 11 defines a pivotal hole 111, a restriction groove 113, and a fixing hole 115. The pivotal hole 111 is non-circular. The restriction groove 113 is curved and defined around the pivotal hole 111. The fixing hole 115 is rectangular and adjacent to the pivotal hole 111. The restriction groove 113 is bounded by a first sidewall 1131 and a second sidewall 1133 on a distal end from the first sidewall 1131.

The rotary bracket 30 forms two connecting arms 31 on an end, parallel to each other. Each connecting arm 31 defines an engaging hole 311, a first latching groove 313, a second latching groove 315, and a locking hole 317. The engaging hole 311 is a circular hole. The first latching groove 313 and the second latching groove 315 are defined at an edge of the connecting arm 31. The locking hole 317 which is rectangular is defined adjacent to the engaging hole 311.

The hinge assembly 50 includes a pivot shaft 51, a first friction washer 52, a second friction washer 53, a rotary member 54, a steady member 56, a plurality of spring washers 57, a flat washer 58, and a fixing member 59.

In the embodiment, the pivot shaft 51 is a fastener which includes a head 511 and a shaft 513 connected thereon. The diameter of the head 511 is larger than the diameter of the shaft 513. The shaft 513 forms a threaded portion 5131 on a distal end. Opposite sides of the shaft 513 are flattened, thereby forming a non-circular cross-section.

The first friction washer 52 forms a first locking tab 521 on an edge, and the second friction washer 53 forms a second locking tab 531 on an edge. In the hinge assembly 50, the first locking tab 521 and the second locking tab 531 extend in converse directions. Each of the first friction washer 52 and the second friction washer 53 defines a center hole (not labeled) which is circular.

Figure 3:
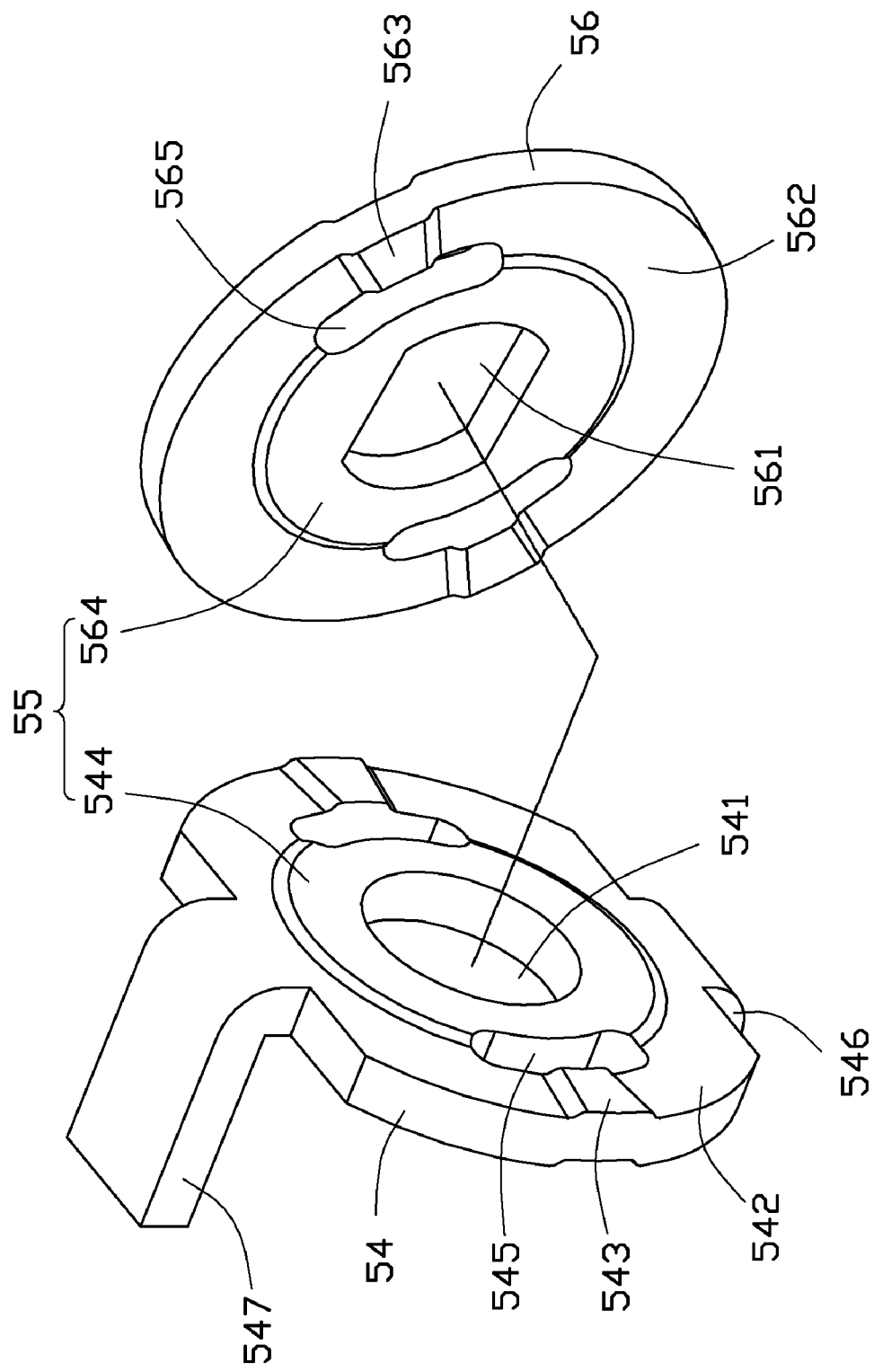
FIG. 3 is an isometric view of the steady member and the rotary member in FIG. 2.

Also referring to FIG. 3, the rotary member 54 defines a circular first assembly hole 541 in a center portion. The rotary member 54 has a first resisting surface 542. The rotary member 54 forms two first peaks 543 and a first resisting portion 544. The first peaks 543 are adjacent to an edge of the rotary member 54. The first resisting portion 544 encircles the first assembly hole 541 at the first resisting surface 542. The first peaks 543 extend toward the first resisting portion 544. The rotary member 54 further defines two curved slots 545 therein between each first peak 543 and the first resisting portion 544. The curved slots 545 allows for tensile stresses of the rotary member 54, thereby the first peaks 543 and the first resisting portion 544 are not deformed after extended usage. The rotary member 54 further forms a fixing projection 546 and a locking projection 547 bent from an opposite edge thereof.

The steady member 56 defines a non-circular second assembly hole 561 in the center portion. The steady member 56 has a second resisting surface 562. The steady member 56 forms two second peaks 563 and a second resisting portion 564. The second peaks 563 are adjacent to an edge of the steady member 56. The second resisting portion 564 is defined at the second resisting surface 562 and encircles the second assembly hole 561. The second peaks 563 extend toward the second resisting portion 564. The steady member 56 further defines two curved slots 565 therein between each second peak 563 and the second resisting portion 564. The curved slots 565 allows for tensile stresses of the steady member 56, thereby the second peaks 563 and the second resisting portion 564 are not deformed after extended usage.

In the hinge assembly 50, the first resisting surface 542 and the second resisting surface 562 face each other, thereby the first resisting portion 544 and the second resisting portion 564 touch each other and form a friction portion 55. A thickness of the friction portion 55, a combined thickness of the first resisting portion 544 and the second portion 564, exceeds or equals a thickness of either of the first peaks 543 or the second peaks 563, and is less than the combined thickness of one first peak 543 and one second peak 563.

The spring washers 57 are generally disk-shaped. In the illustrated embodiment, the number of the spring washers 57 is four, and each of two of the washers 57 are disposed adjacent to the other two but facing opposite directions. The spring washers 57 provide axial force, so as to generate frictional force between the components sleeved on the pivot shaft 51. Each spring washer 57 defines a center hole (not labeled) which is circular.

The flat washer 58 defines a center hole (not labeled) which is non-circular. The fixing member 59 defines a fastener hole (not labeled), engaged by the threaded portion 5131 of the pivot shaft 51.

In assembly of the hinge assembly 50 of the support mechanism 100, the shaft 513 of the pivot shaft 51 successively runs through the pivot hole 111 of one of the supporting legs 11, the center hole of the first friction washer 52, the center hole of the second friction washer 53, the engaging hole 311 of one of the connecting arms 31, the first assembly hole 541 of the rotary member 54, the second assembly hole 561 of the steady member 56, center holes of the spring washers 57, and the center hole of the flat washer 58. The fixing member 59 engages the threaded portion 5131 of the shaft 513 of the pivot shaft 51, and is thus disposed adjacent to the flat washer 58. The first friction washer 52 and the second friction washer 53 are thus disposed between one of the supporting legs 11 and one of the connecting arms 31. The first locking tab 521 of the first friction washer 52 is engaged in the fixing hole 115 of one of the supporting legs 11, and the second locking tab 531 of the second friction washer 53 is engaged in the latching groove 313 of one of the connecting arms 31. The fixing projection 546 of the rotary member 54 is engaged in the latching groove 315 of one of the connecting arms 31. The first resisting surface 542 and the second resisting surface 562 face each other.

The locking projection 547 of the rotary member 54 engages the locking hole 317 of one of the connecting arms 31, and is movably received in the restriction groove 113 of one of the supporting legs 11. Accordingly, one hinge assembly 50 is assembled, and the other hinge assembly 50 is assembled in the same manner. The rotary bracket 30 is rotatable relative to the supporting bracket 10. The supporting bracket 10, the pivot shaft 51, the first friction washer 52, the steady member 56, the flat washer 58, and the fixing member 59 are all non-rotatable relative to one another.

In use, when the rotary bracket 30 is rotated relative to the supporting bracket 10, the rotary member 54 thus rotates together with the rotary bracket 30 relative to the steady member 56. In a first state, the locking projection 547 is movably received in the restriction groove 113 of one of the supporting legs 11, and contacts the first sidewall 1131 of the restriction groove 113. In this state, the first peaks 543 of the rotary member 54 and the second peaks 563 of the steady member 56 do not resist or lightly contact each other, thus the first resisting portion 544 resists the second resisting portion 564.

When the rotary bracket 30 is manually rotated along the direction "X" through a predetermined angle to a second state, the first peaks 543 of the rotary member 54 are blocked by the second peaks 563 of the steady member 56. Thus the rotary bracket 30 cannot be rotated relative to the supporting bracket 10. In the second state, the rotary bracket 30 is tilted relative to the supporting bracket 10.

When the rotary bracket 30 is manually rotated by sufficient force, the first peaks 543 of the rotary member 54 may slide and resist the second peaks 563 of the steady member 56. In this state, the first resisting portion 544 separates from the second resisting portion 564. As the rotary bracket 30 continues to rotate along the direction "X" through a predetermined angle, the locking projection 547 rotates in the restriction groove 113 of one of the supporting legs 11. When the locking projection 547 contacts the second sidewall 1133 of the restriction groove 113, the rotary bracket 30 is in a third state. In this state, the first peaks 543 of the rotary member 54 slide down from the second peaks 563 of the steady member 56, and the first resisting portion 544 resists the second resisting portion 564 again. At this position, the rotary bracket 30 is closed to the supporting bracket 10.

In the hinge assembly 50 of the support mechanism 100, when the rotary member 54 is rotated relative to the steady member 56, a frictional force is generated between the first peaks 543 and the second peaks 563, or between the first resisting portion 544 and the second resisting portion 564. Thus when the rotary bracket 30 is rotated to any desired position relative to the supporting bracket 10, the rotary bracket 30 is retained in the desired position by the frictional forces. In addition, the first peaks 543 of the rotary member 54 resist the second peaks 563 in the second state. In all but the second state, the first peaks 543 do not resist or lightly contact the second peaks 563, thus no resisting force and no frictional force is generated therebetween. Therefore, abrasion between the first peaks 543 and the second peaks 563 is minimized with the hinge assembly 50. The service life of the hinge assembly 100 is thus extended.

In the support mechanism 100, the rotary bracket 30 may be rotated between the first state, the second state, and the third state relative to the supporting bracket 10, thus rotated to tilt or be closed to the supporting bracket 10. When the rotary bracket 30 is rotated to be closed to the supporting bracket 10, an electronic device using the support mechanism 100 occupies little space, thus being conveniently transported or stored.

In alternative embodiments, the number of first peaks 543 of the rotary member 54 and corresponding second peaks 563 of the steady member 56 may be any number desired, such as one, three, or more. The first resisting portion 544 and the second resisting portion 564 may comprise multiple curved protrusions respectively formed at the first resisting surface 542 and the second resisting surface 562. The first resisting portion 544 and the second resisting portion 564 may also be omitted altogether, rather, for example, a friction portion 55 comprises an isolated washer, positioned between the rotary member 54 and the steady member 56 and sleeved on the pivot shaft 51. The entire friction portion 55 may be formed on the rotary member 54 or the steady member 56. The first resisting portion 544 may be formed on the edge of the rotary member 54, and the first peaks 543 may be formed adjacent to the first assembly hole 541. The second resisting portion 564 and the second peaks 563 may be formed on the steady member 56 in a manner as the first resisting portion 544 and the first peaks 543 formed on the rotary member 54.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
   a pivot shaft;
   a rotary member rotatably sleeved on the pivot shaft, forming a first peak having a thickness;
   a steady member rotatable relative to the rotary member, the steady member non-rotatably sleeved on the pivot shaft, forming a second peak having a thickness and facing the first peak of the rotary member; and
   a friction portion having a thickness and being formed by two resisting surfaces facing each other, disposed between the rotary member and the steady member for generating friction between the members;
   wherein the thickness of the friction portion exceeds or equals the thickness of either of the first peak or the second peak, and is less than the combined thickness of the first peak and the second peak.

2. The hinge assembly of claim 1, wherein the friction portion comprises a first resisting portion formed on the rotary member and a second resisting portion formed on the steady member.

3. The hinge assembly of claim 2, wherein the rotary member defines a first assembly hole on the rotary member adjacent to an edge of which the first peak is formed, and the first resisting portion is formed adjacent to the first assembly hole thereof; the steady member defines a second assembly hole on the steady member adjacent to an edge of which the second peak is formed, and the second resisting portion is formed adjacent to the second assembly hole thereof.

4. The hinge assembly of claim 3, wherein the first resisting portion of the rotary member is a circular protrusion extending from the rotary member and encircling the first assembly hole; and the second resisting portion of the steady member is also a circular protrusion extending from the steady member and encircling the second assembly hole.

5. The hinge assembly of claim 4, wherein the first peak extends toward the first resisting portion, and the second peak extends toward the second resisting portion, a slot is defined between the first peak and the first resisting portion of the rotary member, and a slot is defined between the second peak and the second resisting portion of the steady member.

6. The hinge assembly of claim 1, wherein the friction portion comprises a washer between the rotary member and the steady member and sleeved on the pivot shaft.

7. The hinge assembly of claim 1, wherein the friction portion is a protrusion formed on either the rotary member or the second member.

8. A hinge assembly comprising:
   a pivot shaft;
   a rotary member rotatably sleeved on the pivot shaft and forming a first peak; and
   a steady member rotatable relative to the rotary member and non-rotatably sleeved on the pivot shaft, the steady member forming a second peak facing the first peak of the rotary member;
   wherein at least one of the rotary member and the steady member forms a first resisting portion disposed between the rotary member and the steady member for generating friction between the members, and when the first peak of the rotary member resists the second peak of the steady member, a gap is formed between the resisting portion and the other one of the rotary member and the steady member which faces the resisting portion; and
   when the first peak does not resist the second peak, the resisting portion resists the other one of the rotary member and the steady member which faces the resisting portion.

9. The hinge assembly of claim 8, wherein the resisting portion is formed on the rotary member or the steady member.

10. The hinge assembly of claim 8, wherein the rotary member forms said first resisting portion and the steady member forms a second resisting portion, the first resisting portion and the second resisting portion forming a friction portion between the rotary member and the steady member.

11. The hinge assembly of claim 8, wherein the resisting portion comprises a circular protrusion that is closer to a center portion of the rotary member than the first peak is, or closer to a center portion of the steady member than the second peak is.

12. The hinge assembly of claim 8, wherein the pivot shaft comprises a head and a shaft connected thereon, with opposite sides of the shaft flattened.

13. The hinge assembly of claim 8, further comprising spring washers sleeved on the pivot shaft to provide axial forces.

14. A support mechanism, comprising:
   a supporting bracket;
   a rotary bracket; and
   a hinge assembly hinging the rotary bracket to the supporting bracket, the hinge assembly comprising a pivot shaft, a rotary member rotatably sleeved on the pivot shaft and a steady member non-rotatably sleeved on the pivot shaft and facing the rotary member, wherein the rotary member forms a first peak having a thickness and the steady member forms a second peak having a thickness and facing the first peak;
   wherein at least one of the rotary member and the steady member forms a first resisting portion having a thickness and being disposed between the rotary member and the steady member, for generating friction between the members, and the thickness of the resisting portion exceeds or equals the thickness of either of the first peak or the second peak, and is less than the combined thickness of the first peak and the second peak.

15. The support mechanism of claim 14, wherein the resisting portion is formed on the rotary member or the steady member, and resists the other member.

16. The support mechanism of claim 14, wherein the rotary member forms said first resisting portion, and the steady member forms a second resisting portion facing the first resisting portion.

17. The support mechanism of claim 16, wherein the first resisting portion comprises a circular protrusion extending from a center portion of the rotary member, and the second resisting portion comprises a circular protrusion extending from a center portion of the steady member.

18. The support mechanism of claim 17, wherein the rotary member defines an assembly hole at the center portion, and the first resisting portion encircles the assembly hole; the steady member also defines an assembly hole at the center portion, and the second resisting portion encircles the assembly hole.

19. The support mechanism of claim 18, wherein the first peak is formed adjacent to an edge of the rotary member, and the second peak is formed adjacent to an edge of the steady member.

20. The support mechanism of claim 19, wherein the first peak extends toward the first resisting portion and the second peak extends toward the second resisting portion, and wherein a first slot is defined in the rotary member between the first peak and the first resisting portion and a second slot is defined in the steady member between the second peak and the second resisting portion.

* * * * *